Jan. 28, 1936. J. F. BIESIK 2,029,218
ANTIFROST GLASS
Filed March 12, 1934
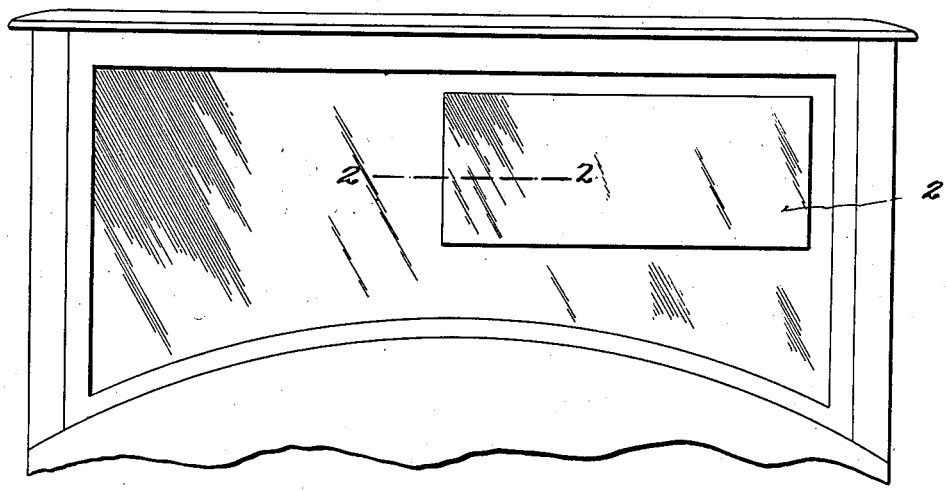
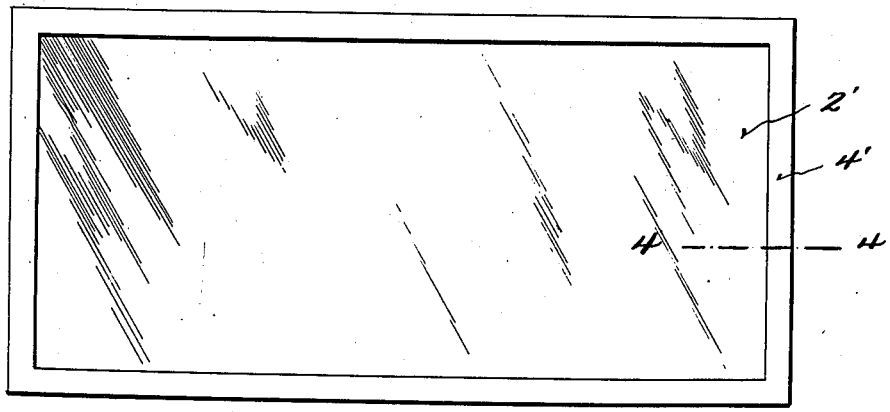
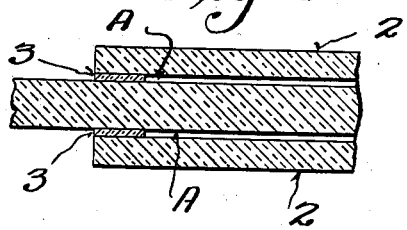
Inventor
J. F. Biesik
By
Attorneys Patented Jan. 28, 1936

2,029,218

UNITED STATES PATENT OFFICE 2,029,218

ANTIFROST GLASS

John F. Biesik, Milwaukee, Wis.

Application March 12, 1934, Serial No. 715,129

1 Claim. (Cl. 20—40.5)

My invention refers to antifrost glass for automobile windshields or windows, or any glass which may be subjected to climatic conditions whereby condensation would mar the vision.

With the above object in view, the invention consists in certain peculiarities of construction and combination of parts, as will be hereinafter fully set forth with reference to the accompanying drawing and subsequently claimed.

In the drawing, Figure 1 illustrates the face view of an automobile windshield, having a part thereof equipped with an antifrost glass, embodying the features of my invention.

Figure 2 is a magnified cross section of a fragment of the same.

Figure 3 is a full panel glass embodying the features of my invention, and

Figure 4 is a magnified detailed cross section of the same.

Referring by character to the drawing, I represents a standard windshield provided with inner and outer glass panels 2 and 2', which panels in this case are substantially smaller than the windshield and are positioned conveniently for the vision of the driver. These panels are alined with each other and permanently secured to the windshield I by adhesive material, such for example as liquid glass (sodium silicate solution), the same being in the form of a narrow strip 3—3. The liquid glass strip extends around the four sides of the panels 2 and 2', and due to its thickness it offsets said panels from the main windshield glass sufficiently to form dead air spaces A.

The purpose of thus offsetting the panels from the main windshield glass is to form completely enclosed dead air spaces which will prevent the transmission of heat through the composite structure thus produced, whereby a sufficient degree of resistance to the transmission of heat is provided to prevent condensation of moisture upon the corresponding surface of the glass and to prevent frosting thereof in cold weather, thus providing a permanently unobstructed portion of the windshield, permitting clear vision at all times.

As best shown in Figure 4, the panels may be made up of three sections, 2'—2', and an intermediate section I'. In this instance the panels are all of the same dimension and filler strips 3' are interposed between said panels throughout the entire outer edges. The panels may be tightly bound together by a frame 4 of metal, or other suitable material.

The material in this instance is folded over upon opposite sides to form binding flanges 4', as shown. Thus, the three glass panels are securely held together and their edges so arranged as to prevent the escape of air from the spaced air chambers on each side of the main panel I'.

Obviously, while I have shown three glass panels as an exemplification of my invention, I may employ a greater number in some instances, and the glass panels may be secured together and spaced from each other by any form of strip, or glue, or analogous material.

I claim:—

A vehicle windshield having a main panel of glass and a pair of secondary panels of glass attached thereto, said secondary panels being similar to one another in size and shape but being much smaller than the main panel, and being disposed on opposite sides of said main panel in horizontal alinement with one another, and in proper position to cooperate with the eyes of the operator of the vehicle to afford unobstructed vision of the road, said secondary panels being held in spaced relationship to the main panel, to provide dead air spaces between them and the main panel, by a border of a transparent inorganic cement, which is stable even when exposed to light and heat.

JOHN F. BIESIK.